United States Patent
Bandholz et al.

(10) Patent No.: US 7,710,976 B2
(45) Date of Patent: May 4, 2010

(54) METHODS, SYSTEMS AND COMPUTER PROGRAM PRODUCTS FOR PACKET PRIORITIZATION BASED ON DELIVERY TIME EXPECTATION

(75) Inventors: Justin P. Bandholz, Cary, NC (US); Clifton E. Kerr, Durham, NC (US); Joseph E. Maxwell, Cary, NC (US); Philip L. Weinstein, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 12/169,266

(22) Filed: Jul. 8, 2008

(65) Prior Publication Data

US 2010/0008376 A1    Jan. 14, 2010

(51) Int. Cl.
*H04L 12/28* (2006.01)
*H04L 12/56* (2006.01)
(52) U.S. Cl. .............................. 370/395.4; 370/395.42
(58) Field of Classification Search ................ 370/252, 370/395.4, 395.42
See application file for complete search history.

(56) References Cited

U.S. PATENT DOCUMENTS

| 6,374,405 | B1 * | 4/2002 | Willard ........................ 725/94 |
| 6,760,309 | B1 | 7/2004 | Rochberger et al. |
| 6,931,003 | B2 | 8/2005 | Anderson |
| 7,391,777 | B2 * | 6/2008 | Sridhar et al. .......... 370/395.21 |
| 2002/0194361 | A1 * | 12/2002 | Itoh et al. .................... 709/233 |
| 2005/0243733 | A1 * | 11/2005 | Crawford et al. ............ 370/252 |
| 2007/0097865 | A1 * | 5/2007 | Song et al. .................. 370/235 |
| 2007/0121618 | A1 | 5/2007 | Hirano |
| 2007/0189187 | A1 * | 8/2007 | Ryu et al. .................... 370/252 |
| 2008/0095066 | A1 * | 4/2008 | Lee et al. .................... 370/252 |

* cited by examiner

*Primary Examiner*—Chi H Pham
*Assistant Examiner*—Farah Faroul
(74) *Attorney, Agent, or Firm*—Cantor Colburn LLP; Cynthia Seal

(57) ABSTRACT

Methods, systems and computer program products for packet prioritization based on delivery time expectation. Exemplary embodiments include receiving a packet for routing, estimating a TimeToDestination for the packet, the estimating performed by a Internet Control Message Protocol, reading a TimeToDeliver field from each the Internet Protocol Header of the packet to extract data on when the packet needs to be at the destination, determining a MaxQueueDelay for the packet, the MaxQueueDelay calculated by subtracting the TimeToDeliver from the TimeToDestination, passing a lower priority packet if the lower priority packet has a lower MaxQueueDelay, and decrementing the TimeToDeliver by an amount of time the network router has had the packet in the queue before passing the packet to a next router, thereby communicating to the next router how much time is left before the packet must be delivered.

4 Claims, 2 Drawing Sheets

METHODS, SYSTEMS AND COMPUTER PROGRAM PRODUCTS FOR PACKET PRIORITIZATION BASED ON DELIVERY TIME EXPECTATION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to routers and packet prioritization, and particularly to methods, systems and computer program products for packet prioritization based on delivery time expectation.

2. Description of Background

Currently packet priority schemes for networks provide hardcoded prioritization. This means that if packet A has priority over packet B then it will always be passed first. There are some instances where this is actually not ideal. If the requirement of packet A is to arrive within X ms and packet B should arrive within Y ms then the condition could exist that packet A is passed before packet B even if this means that packet B misses its delivery requirements and packet A arrives with plenty of time to spare.

SUMMARY OF THE INVENTION

Exemplary embodiments include a packet prioritization method based on delivery time expectation, the method including receiving a packet for routing, wherein the packet is prioritized based on respective delivery requirements and relative distance the packet's destination, and wherein the packet has an Internet Protocol header, estimating a TimeToDestination for the packet, the estimating performed by a Internet Control Message Protocol, reading a TimeToDeliver field from each the Internet Protocol Header of the packet to extract data on when the packet needs to be at the destination, determining a MaxQueueDelay for the packet, the MaxQueueDelay calculated by subtracting the TimeToDeliver from the TimeToDestination, passing a lower priority packet if the lower priority packet has a lower MaxQueueDelay, when the MaxQueueDelay of the packet being longer than the packet would take in a current queue length, based on the packet priority and decrementing the TimeToDeliver by an amount of time the network router has had the packet in the queue before passing the packet to a next router, thereby communicating to the next router how much time is left before the packet must be delivered.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides a packet prioritization scheme that calculates for each packet the amount of time left before the packet needs to be delivered. The scheme also estimates how long the packet will take to get to the destination. Since packets are prioritized based on their delivery requirements and relative distances from their targets, lower priority packets can pass when they are more urgent (i.e., they require quicker service in order to meet delivery requirements) as long as this does not jeopardize the delivery of a packet within its requirements.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include methods, systems and computer program products for packet prioritization based on delivery time expectation. In exemplary embodiments, the methods, systems and computer program products provide a packet prioritization scheme that calculates for each packet the amount of time left before the packet needs to be delivered. The scheme also estimates how long the packet will take to get to the destination. Since packets are prioritized based on their delivery requirements and relative distances from their targets, lower priority packets can pass when they are more urgent (i.e., they require quicker service in order to meet delivery requirements) as long as this does not jeopardize the delivery of a packet within its requirements.

Figure 1:
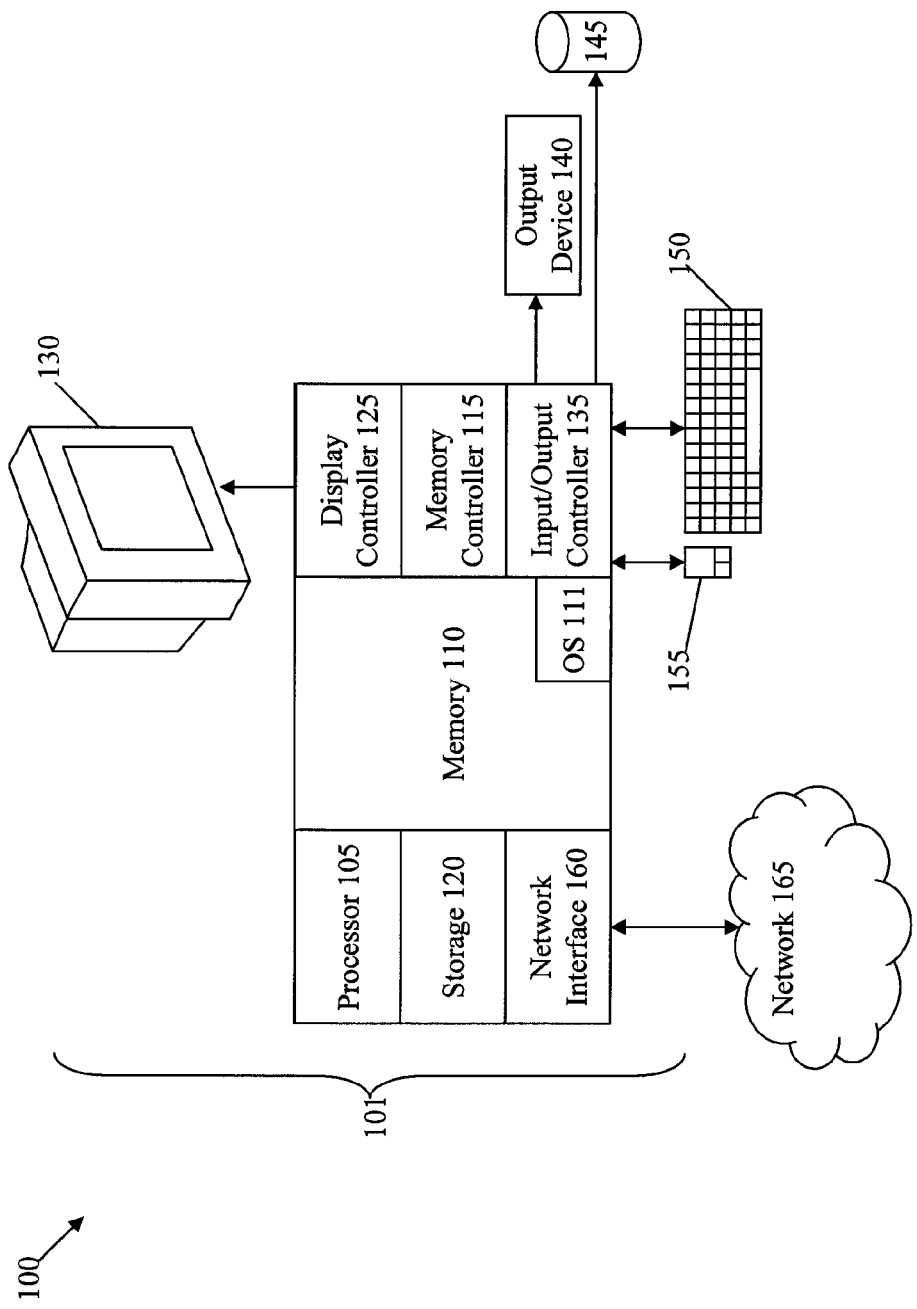
FIG. 1 illustrates an exemplary embodiment of a system for packet prioritization based on delivery time expectation.

FIG. 1 illustrates an exemplary embodiment of a system 100 for packet prioritization based on delivery time expectation. In exemplary embodiments, the exemplary user interfaces described herein can be implemented on the system 100. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the packet prioritization methods described herein in accordance with exemplary embodiments and a suitable operating system (OS) 111. The operating system 111 essentially controls the execution of other computer programs, such the packet prioritization systems and methods described herein, and provides scheduling, input-output control, file and data management, memory management, and communication control and related services.

The packet prioritization methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the packet prioritization methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As described further here, the packet prioritization schemes can be implemented in a router. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The packet prioritization methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The packet prioritization methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the packet prioritization methods are implemented in hardware, the packet prioritization methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, an optional "TimeToDeliver" field is inserted into the IP (or other networking) protocol header to provide information on when the packet needs to be at the destination. In exemplary embodiments, the router can estimate how long it will take a packet to get to the destination. In exemplary embodiments, the TimeToDeliver can be estimated using Internet Control Message protocol (ICMP). Any prediction cannot be guaranteed but that is acceptable for a prioritization scheme that already has no guarantees.

In exemplary embodiments, the router subtracts the TimeToDeliver from its known TimeToDestination to calculate the MaxQueueDelay for each packet. If the MaxQueueDelay is longer than the packet would take in the current queue length, based on packet priority, then a lower priority packet may be allowed to pass this packet if it has a lower MaxQueueDelay.

In exemplary embodiments, the router also decrements the TimeToDeliver by the amount of time the router has had the packet in queue before passing the packet to the next router, which allows the next router to know how much time is left before the packet must be delivered.

Figure 2:
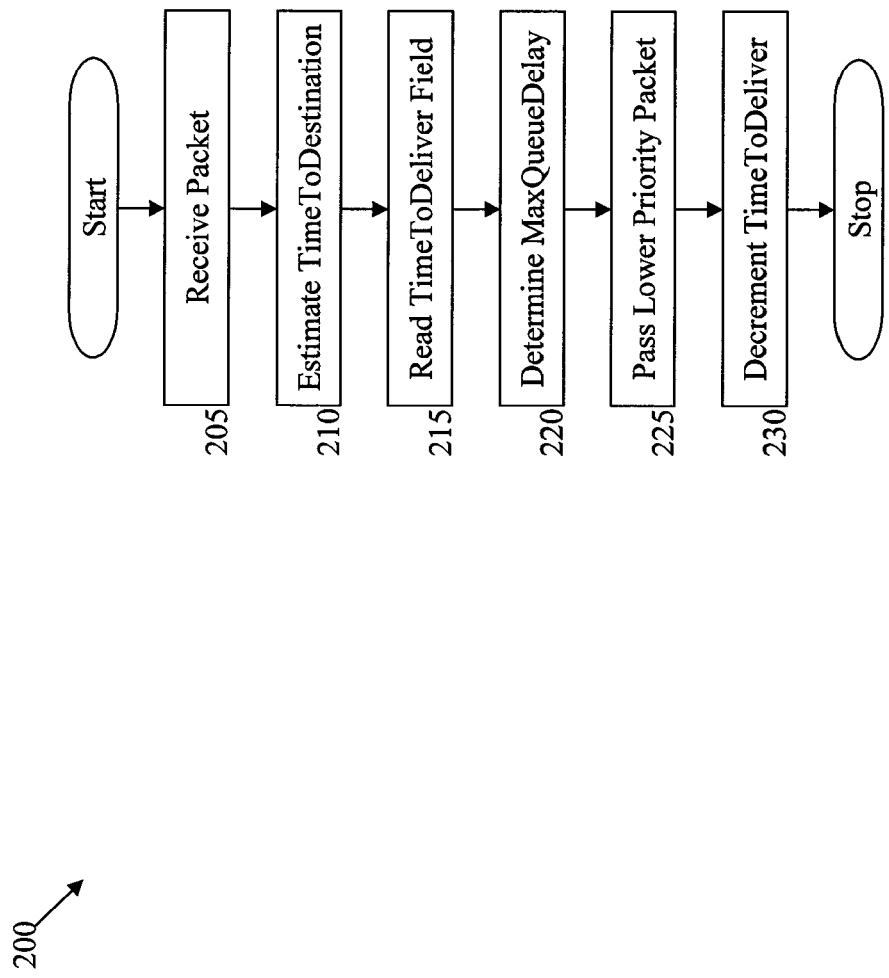
FIG. 2 illustrates a flowchart of a method for packet prioritization based on delivery time expectation in accordance with exemplary embodiments.

FIG. 2 illustrates a flowchart of a method 200 for packet prioritization based on delivery time expectation in accordance with exemplary embodiments. At block 205, the router receives a packet for routing. At block 210, the router estimates a TimeToDestination for the packet, in which the estimating can be performed by an Internet Control Message Protocol (ICMP). At block 215, the router reads a TimeToDeliver field from each the Internet Protocol Header of the packet to extract data on when the packet needs to be at the destination. At block 220, the router determines a MaxQueueDelay for the packet, in which the MaxQueueDelay can be calculated by subtracting the TimeToDeliver from the TimeToDestination. At block 225, the router passes a lower priority packet if the lower priority packet has a lower MaxQueueDelay. In exemplary embodiments, this passing is done in response to the MaxQueueDelay of the packet being longer than the packet would take in a current queue length, based on the packet priority. At block 230, the router decrements the TimeToDeliver by an amount of time the network router has had the packet in the queue before passing the packet to a next router, thereby communicating to the next router how much time is left before the packet must be delivered.

In exemplary embodiments, the lower priority packet is allowed to pass the higher priority packet if the higher priority packet does not sit in the queue longer than the MaxQueueDelay of the higher priority packet. In exemplary embodiments, the lower priority packet is not allowed to pass the higher priority packet if the higher priority packet has a MaxQueueDelay less than the MaxQueueDelay of the lower priority packet. In exemplary embodiments, the lower priority packet is not allowed to pass the higher priority packet if the higher priority packet has a MaxQueueDelay equal to the MaxQueueDelay of the lower priority packet.

The following examples illustrate packet prioritization schemes in accordance with exemplary embodiments:

EXAMPLE 1

| Packet | TimeToDeliver | TimeToDestination | MaxQueueDelay |
|---|---|---|---|
| A | 20 ms | 10 ms | 10 ms |
| B | 7 ms | 5 ms | 2 ms |

In Example 1, Packet B is allowed to pass packet A as long as Packet A will not sit in the queue longer than 10 ms.

EXAMPLE 2

| Packet | TimeToDeliver | TimeToDestination | MaxQueueDelay |
|---|---|---|---|
| A | 7 ms | 5 ms | 2 ms |
| B | 20 ms | 10 ms | 10 ms |

In Example 2, Packet B cannot lass Packet A since it is less urgent.

EXAMPLE 3

| Packet | TimeToDeliver | TimeToDestination | MaxQueueDelay |
|---|---|---|---|
| A | 20 ms | 10 ms | 10 ms |
| B | 20 ms | 10 ms | 10 ms |

In Example 3, Packet B cannot lass Packet A since they are equally urgent.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a network router having a queue, a packet prioritization method based on delivery time expectation, the method consisting of:
   receiving a packet for routing, wherein the packet is prioritized based on respective delivery requirements and relative distance to the packet's destination, and wherein the packet has an Internet Protocol header;
   estimating a TimeToDestination for the packet, the estimating performed by an Internet Control Message Protocol;
   reading a TimeToDeliver field from the Internet Protocol Header of the packet to extract data on when the packet needs to be at the destination;
   determining a MaxQueueDelay for the packet, the MaxQueueDelay calculated by subtracting the TimeToDeliver from the TimeToDestination;
   in response to the MaxQueueDelay of the packet being longer than the packet would take in a current queue length, based on the packet priority, passing a lower priority packet if the lower priority packet has a lower MaxQueueDelay; and
   decrementing the TimeToDeliver by an amount of time the network router has had the packet in the queue before passing the packet to a next router, thereby communicating to the next router how much time is left before the packet must be delivered.

2. The method as claimed in claim 1 wherein the lower priority packet is allowed to pass a higher priority packet if the higher priority packet does not sit in the queue longer than the MaxQueueDelay of the higher priority packet.

3. The method as claimed in claim 1 wherein the lower priority packet is not allowed to pass a higher priority packet if the higher priority packet has a MaxQueueDelay less than the MaxQueueDelay of the lower priority packet.

4. The method as claimed in claim 1 wherein, the lower priority packet is not allowed to pass a higher priority packet if the higher priority packet has a MaxQueueDelay equal to the MaxQueueDelay of the lower priority packet.

* * * * *